US012659454B2

(12) United States Patent
Kuo et al.

(10) Patent No.: US 12,659,454 B2
(45) Date of Patent: Jun. 16, 2026

(54) TEMPORAL MOTION VECTOR PREDICTION

(71) Applicant: BEIJING DAJIA INTERNET INFORMATION TECHNOLOGY CO., LTD., Beijing (CN)

(72) Inventors: Che-Wei Kuo, San Diego, CA (US); Xiaoyu Xiu, San Diego, CA (US); Yi-Wen Chen, San Diego, CA (US); Xianglin Wang, San Diego, CA (US); Hong-Jheng Jhu, San Diego, CA (US); Wei Chen, San Diego, CA (US); Ning Yan, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 195 days.

(21) Appl. No.: 18/405,242

(22) Filed: Jan. 5, 2024

(65) Prior Publication Data

US 2024/0146906 A1 May 2, 2024

Related U.S. Application Data

(63) Continuation of application No. PCT/US2022/036225, filed on Jul. 6, 2022.
(Continued)

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/159* (2014.11);
(Continued)

(58) Field of Classification Search
CPC .. H04N 19/105; H04N 19/117; H04N 19/159; H04N 19/176; H04N 19/196;
(Continued)

(56) References Cited

U.S. PATENT DOCUMENTS 10,827,171 B2    11/2020  Li et al.
2019/0132606 A1*  5/2019  Su .................... H04N 19/577
(Continued)

FOREIGN PATENT DOCUMENTS

WO       2019192491 A1    10/2019
WO       2020073969 A1     4/2020
WO       2020141886 A1     7/2020

OTHER PUBLICATIONS

WO 2020/251930 A1 (Year: 2019).*
(Continued)

*Primary Examiner* — Joseph W Becker
(74) *Attorney, Agent, or Firm* — Scully, Scott, Murphy & Presser, P.C.

(57)                ABSTRACT

A computer system acquires a video bitstream. The video bitstream includes data associated with multiple encoded pictures. Each encoded picture includes one or more coding units (CUs). While decoding a current CU of a picture in the video bitstream, the current CU having a plurality of reference subblocks located in one or more reference pictures, in accordance with a determination that the plurality of reference subblocks satisfy a first set of predefined conditions for enabling a subblock-based temporal motion vector prediction (SbTMVP) mode, the computer system retrieves, from the video bitstream, syntax elements associated with the SbTMVP mode. The computer system then decodes the current CU using the retrieved syntax elements associated with the SbTMVP mode.

20 Claims, 18 Drawing Sheets

Related U.S. Application Data

(60) Provisional application No. 63/218,822, filed on Jul. 6, 2021.

(51) Int. Cl.

| | |
|---|---|
| *H04N 19/159* | (2014.01) |
| *H04N 19/176* | (2014.01) |
| *H04N 19/196* | (2014.01) |
| *H04N 19/513* | (2014.01) |
| *H04N 19/82* | (2014.01) |

(52) U.S. Cl.
CPC ......... *H04N 19/176* (2014.11); *H04N 19/196* (2014.11); *H04N 19/521* (2014.11); *H04N 19/82* (2014.11)

(58) Field of Classification Search
CPC .... H04N 19/521; H04N 19/82; H04N 19/109; H04N 19/86; H04N 19/119; H04N 19/139; H04N 19/52; H04N 19/70
See application file for complete search history.

(56) References Cited

U.S. PATENT DOCUMENTS

| | | |
|---|---|---|
| 2019/0158860 A1 | 5/2019 | Yasugi et al. |
| 2021/0084324 A1 | 3/2021 | Ray et al. |
| 2021/0185353 A1 | 6/2021 | Xiu et al. |
| 2022/0060689 A1* | 2/2022 | Jang ..................... H04N 19/132 |

OTHER PUBLICATIONS

International Search Report dated Oct. 28, 2022 issued in PCT/US2022/036225.
Extended European search report dated May 12, 2025 received in Euroepan Patent Application No. 22838339.4.

* cited by examiner

Motion shift is
set to A1's
motion

Legend:

⟶▶ : Motion vector_L0 from collocated block

------▶ : Motion vector_L0 for current block (after scaling)

⟶▷ : Motion vector_L1 from collocated block

------▷ : Motion vector_L1 for current block (after scaling)

Legend:

———→ : Motion vector_L0 from collocated block

------▸ : Motion vector_L0 for current block (after scaling)

———▷ : Motion vector_L1 from collocated block

------▷ : Motion vector_L1 for current block (after scaling)

POC 10

POC 9

POC 8

1100

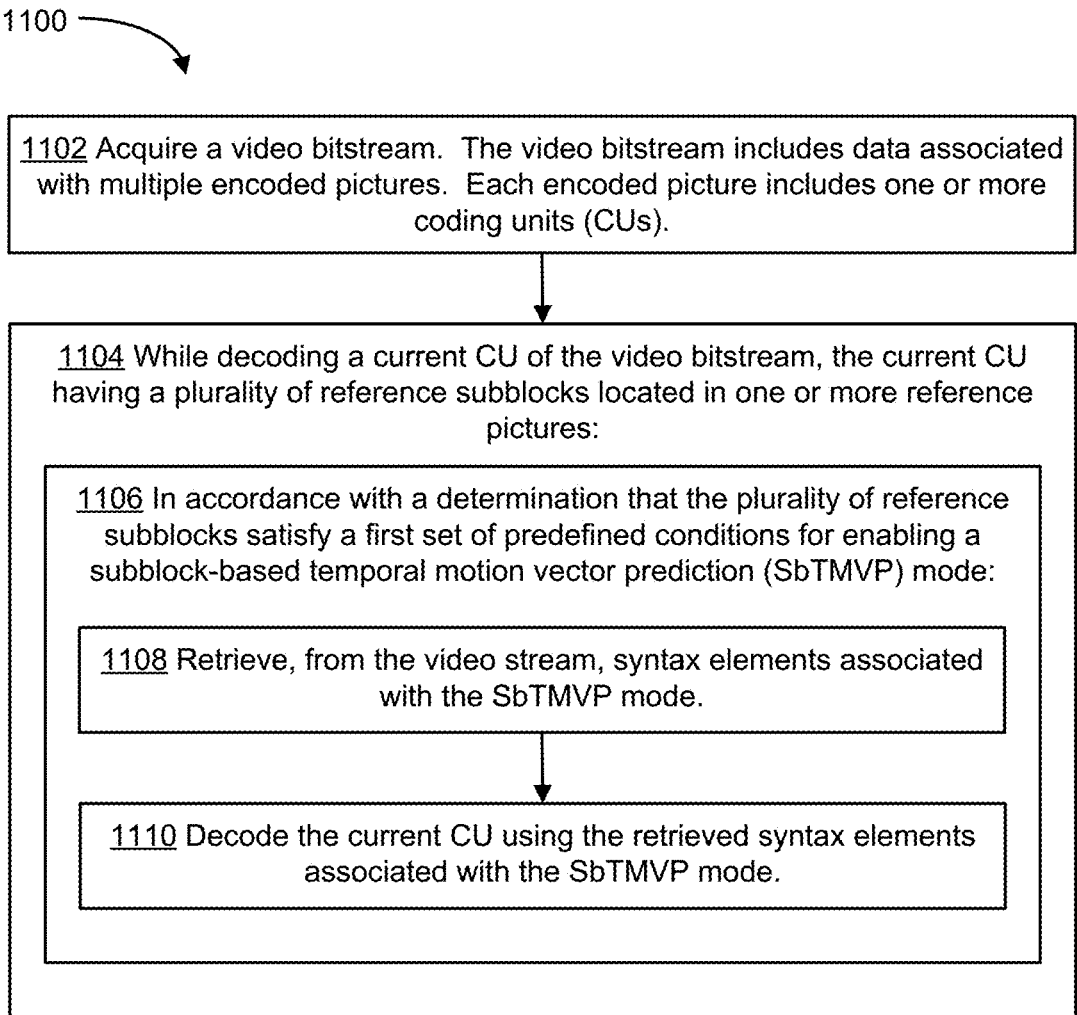

1102 Acquire a video bitstream. The video bitstream includes data associated with multiple encoded pictures. Each encoded picture includes one or more coding units (CUs).

1104 While decoding a current CU of the video bitstream, the current CU having a plurality of reference subblocks located in one or more reference pictures:

1106 In accordance with a determination that the plurality of reference subblocks satisfy a first set of predefined conditions for enabling a subblock-based temporal motion vector prediction (SbTMVP) mode:

1108 Retrieve, from the video stream, syntax elements associated with the SbTMVP mode.

1110 Decode the current CU using the retrieved syntax elements associated with the SbTMVP mode.

FIG. 11

TEMPORAL MOTION VECTOR PREDICTION

CROSS-REFERENCE TO RELATED APPLICATIONS

This application is a continuation of PCT International Application No. PCT/US2022/036225 filed on Jul. 6, 2022, which is based upon and claims priority to U.S. Provisional Application No. 63/218,822, filed on Jul. 6, 2021, entitled "Improvements on Temporal Motion Vector Prediction," the entire contents of each of which are incorporated herein by reference.

TECHNICAL FIELD

This application is related to video coding and compression. More specifically, this application relates to methods and apparatus for improving the coding efficiency/video quality of Subblock-based Temporal Motion Vector Prediction (SbTMVP).

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. A Joint Video Exploration Team (JVET) was formed in October 2015 by ITU-T VCEG and ISO/IEC MPEG, to begin significant study of advanced technologies that could enable substantial enhancement of coding efficiency. One reference software called JEM was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10th JVET meeting, which demonstrated compression efficiency gain over the HEVC around 40%. Based on such evaluation results, the JVET launched a new project to develop the new generation video coding standard that is named as VVC. In the same month, one reference software codebase, called VVC test model (VTM), was established for demonstrating a reference implementation of the VVC standard.

One of the modes that is supported by VVC is the Subblock-based temporal motion vector prediction (SbTMVP) mode. Similar to the temporal motion vector prediction (TMVP) in HEVC, SbTMVP uses the motion field in a collocated picture to improve motion vector prediction and merge mode for coding units (CUs) in a current picture at a sub-coding unit (sub-CU) level.

Reducing the sub-CU motion compensation (MC) size in SbTMVP can lead to better compression efficiency. On the other hand, SbTMVP can introduce noticeable subblock boundary artifacts, especially for slices coded at high quantization parameter values.

SUMMARY

Embodiments of the present disclosure provide for improved methods, systems, and devices for improving the coding efficiency and video quality of the SbTMVP mode.

According to some implementations of the present disclosure, a method of decoding a video bitstream, includes acquiring a video bitstream. The video bitstream includes data associated with multiple encoded pictures. Each encoded picture including one or more coding units (CUs). A current CU of the video bitstream includes a plurality of reference subblocks located in one or more reference pictures. The method includes, while decoding the current CU of the video bitstream, in accordance with a determination that the plurality of reference subblocks satisfy a first set of predefined conditions for enabling a subblock-based temporal motion vector prediction (SbTMVP) mode, retrieving, from the video bitstream, syntax elements associated with the SbTMVP mode. The method includes decoding the current CU using the retrieved syntax elements associated with the SbTMVP mode.

In accordance with some implementations of the present disclosure, a computer system includes one or more processors and memory. The memory stores one or more programs configured for execution by the one or more processors. The one or more programs include instructions for performing any of the methods disclosed herein.

In accordance with some implementations of the present disclosure, a non-transitory computer-readable medium stores one or more programs configured for execution by one or more processors of a computer system. The one or more programs include instructions for performing any of the methods disclosed herein.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 11 is a flowchart illustrating a method of decoding a video bitstream according to some implementations.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

Figure 1:
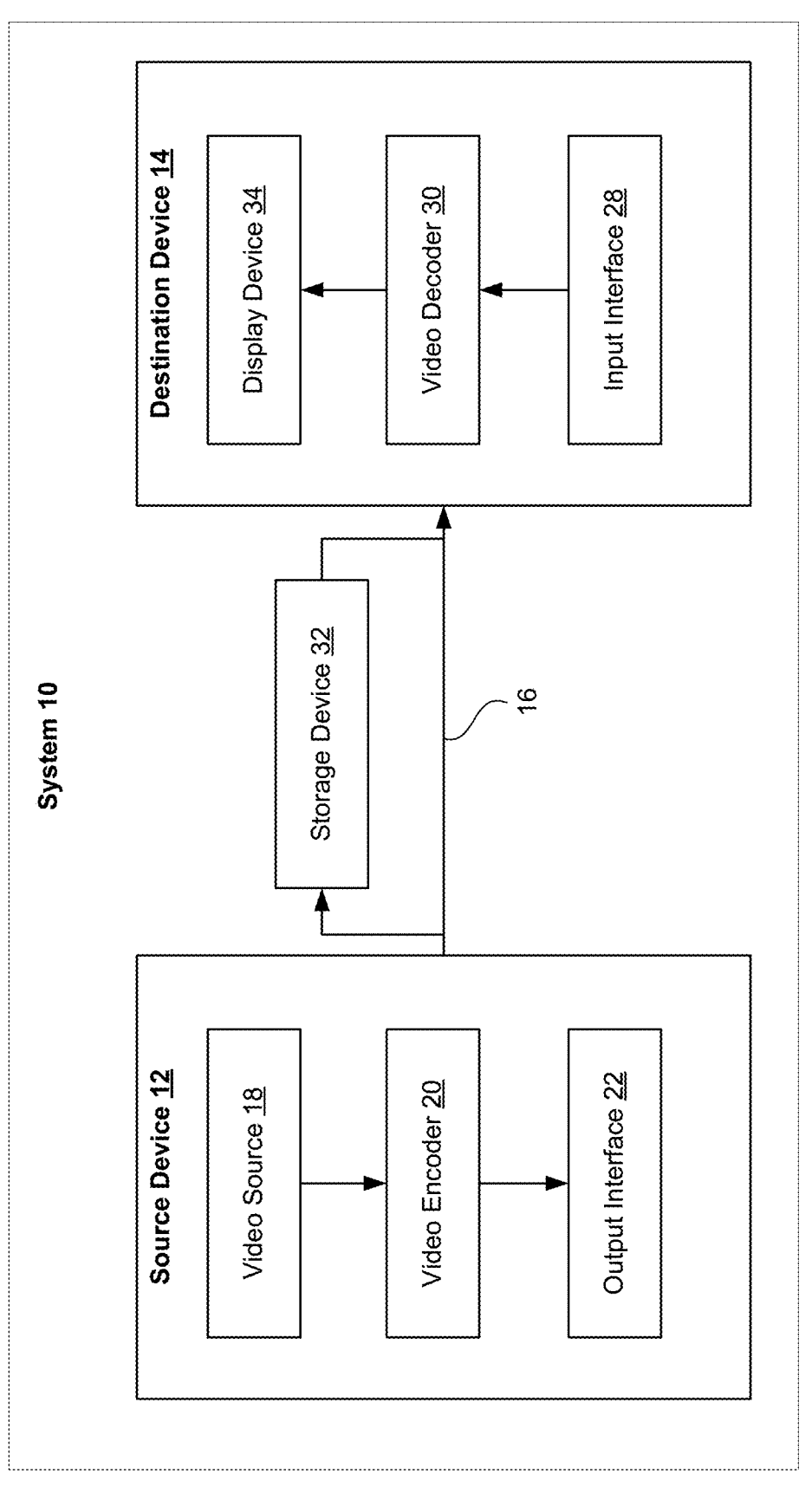
FIG. 1 is a block diagram illustrating an exemplary system for encoding and decoding video blocks in accordance with some implementations of the present disclosure.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both, that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
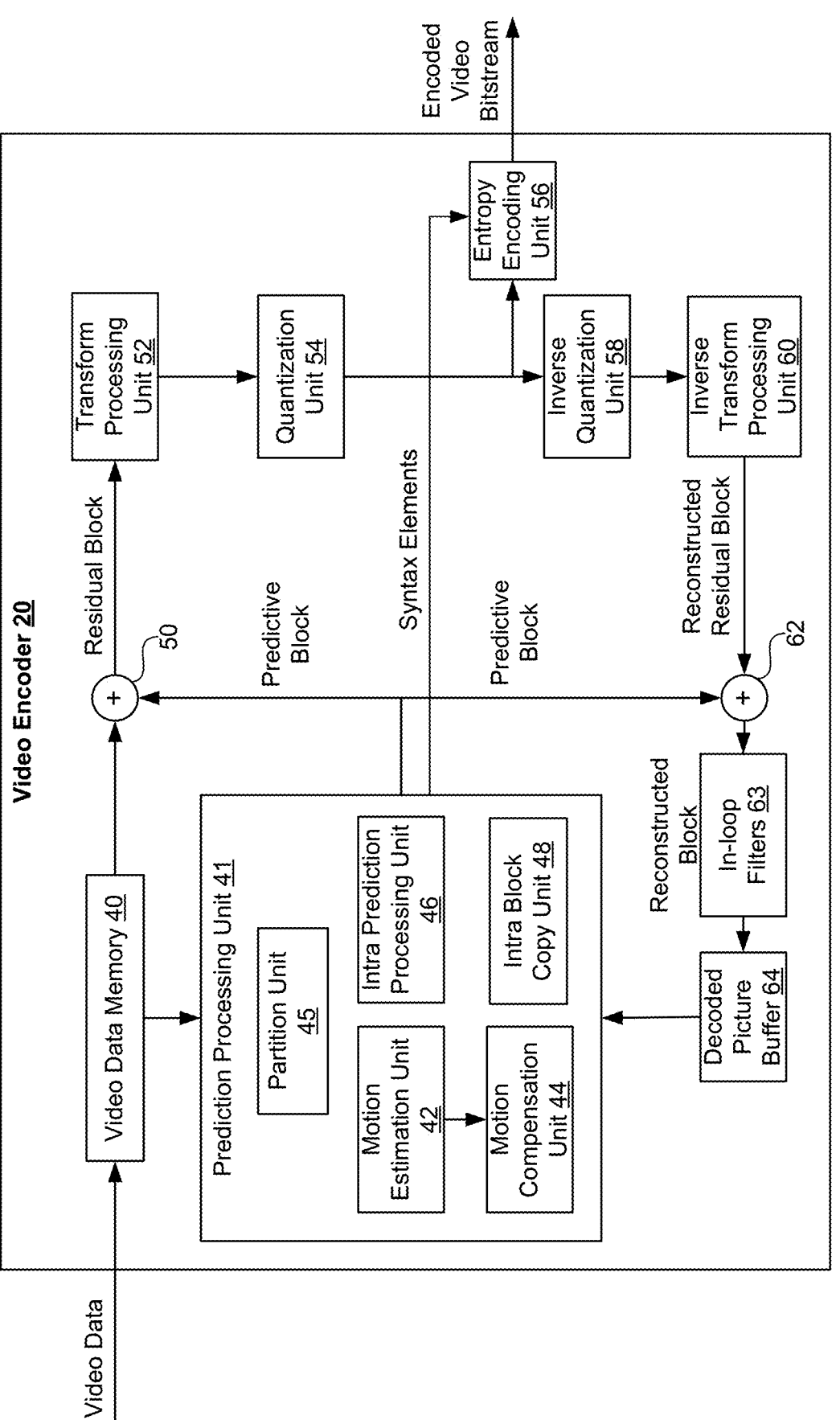
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1, or archived in the storage device 32 as shown in FIG. 1 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 3:
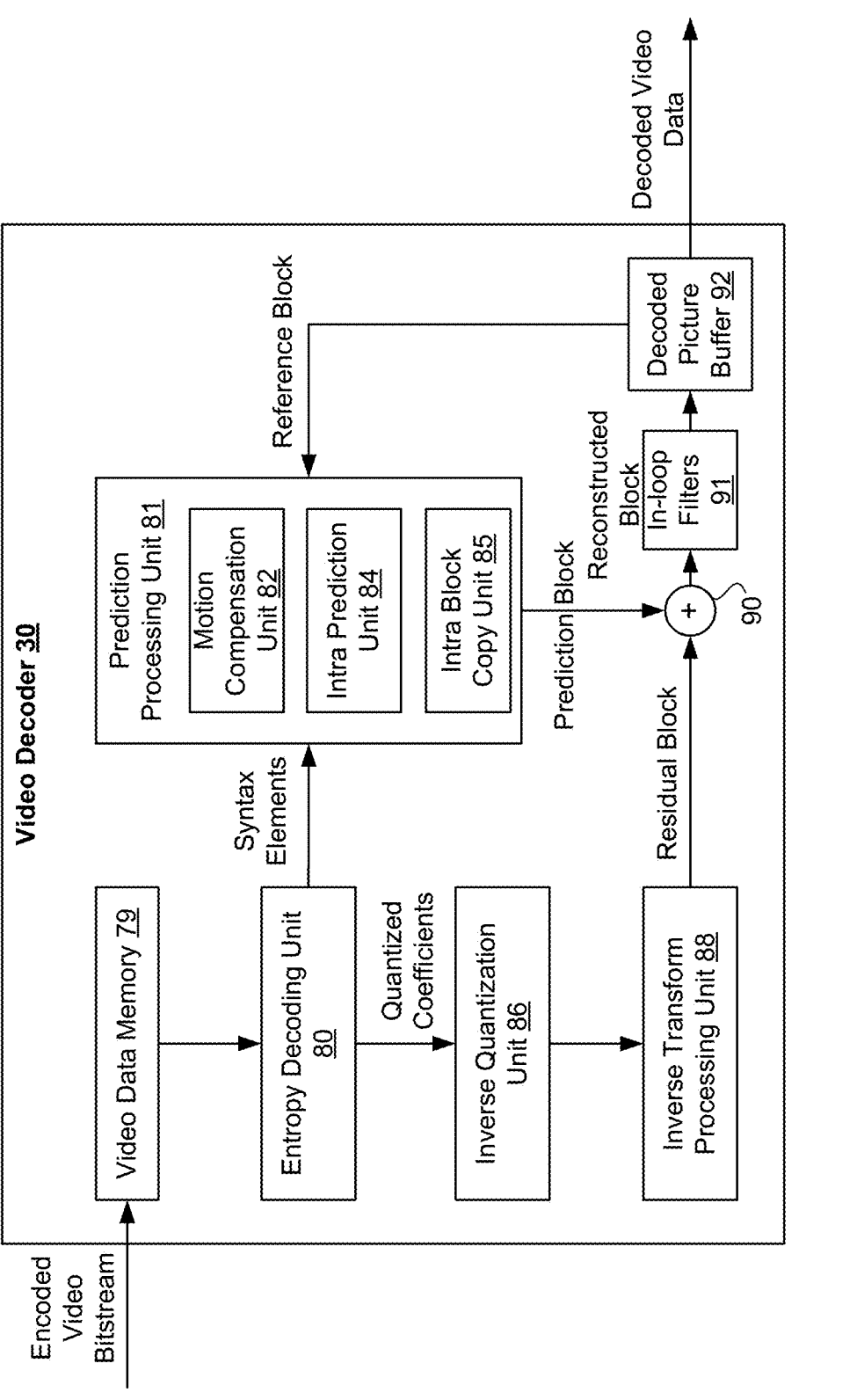
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
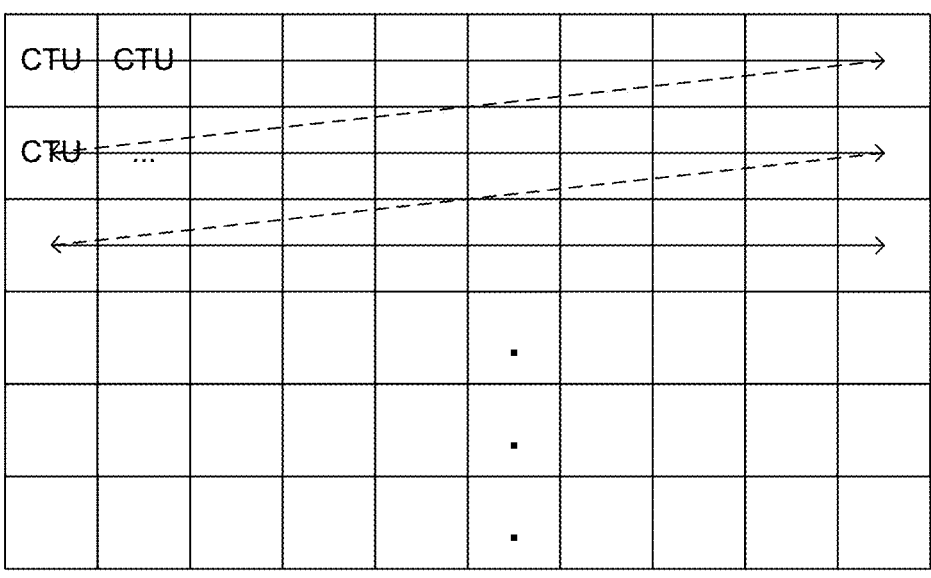
FIGS. 4A, 4B, 4C, 4D and 4E are block diagrams illustrating how a frame is recursively partitioned into multiple video blocks of different sizes and shapes in accordance with some implementations of the present disclosure.
Figure 4B:
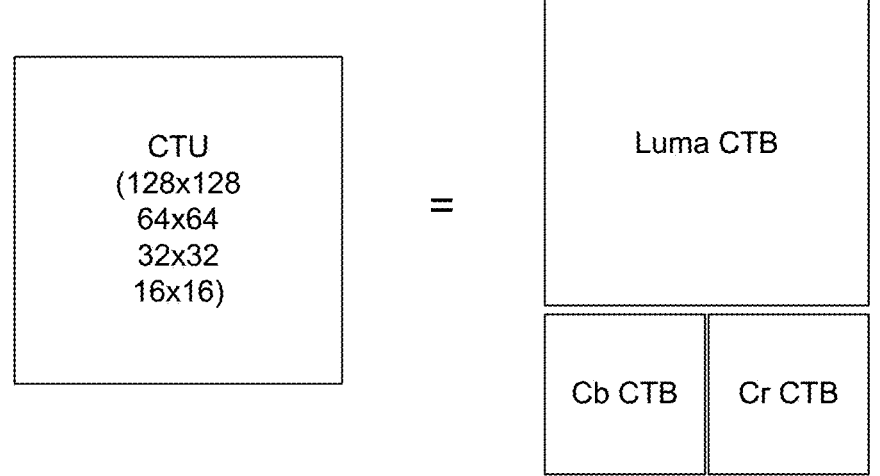

As shown in FIG. 4A, the video encoder 20 (or more specifically the partition unit 45) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
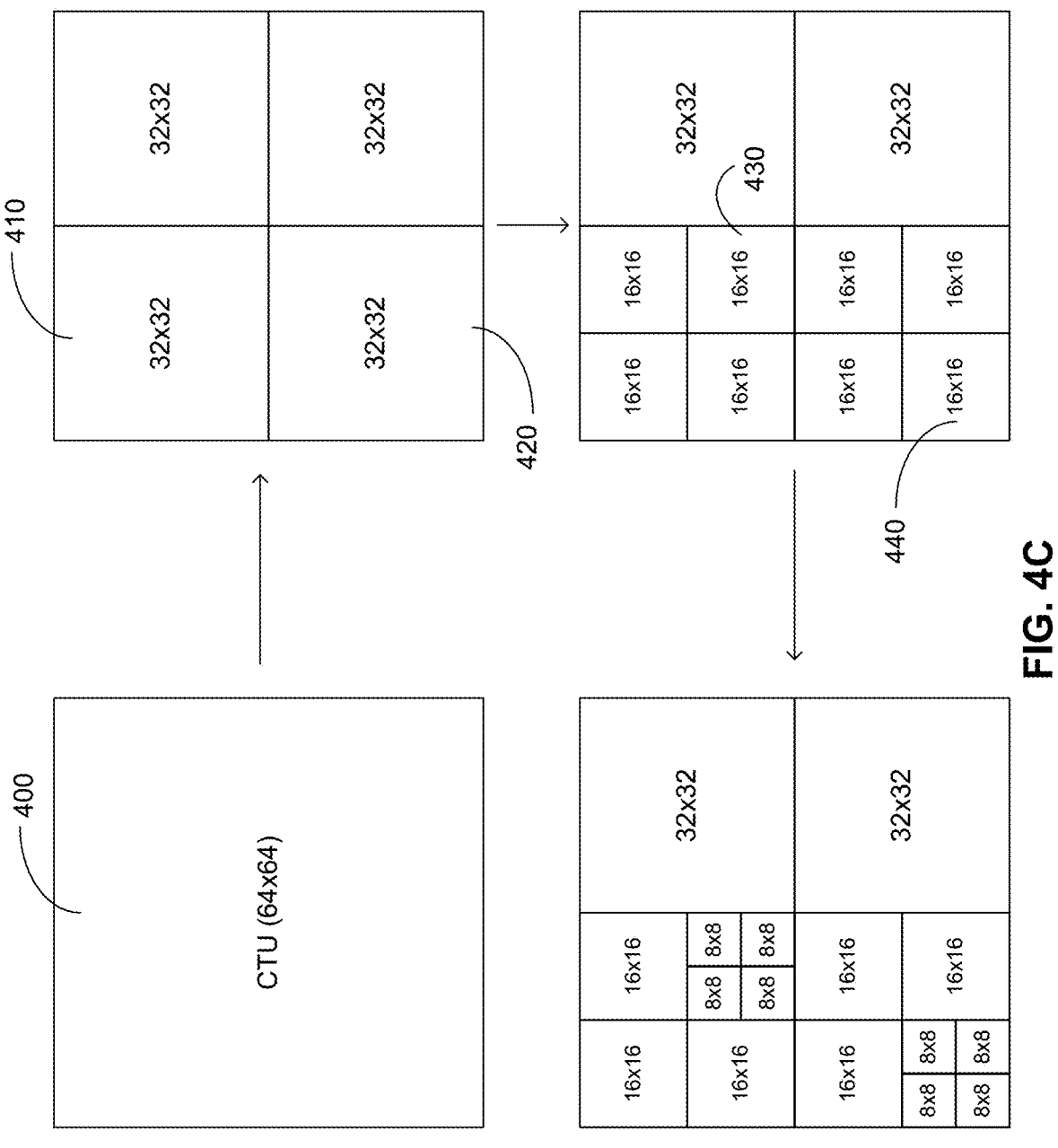
Figure 4D:
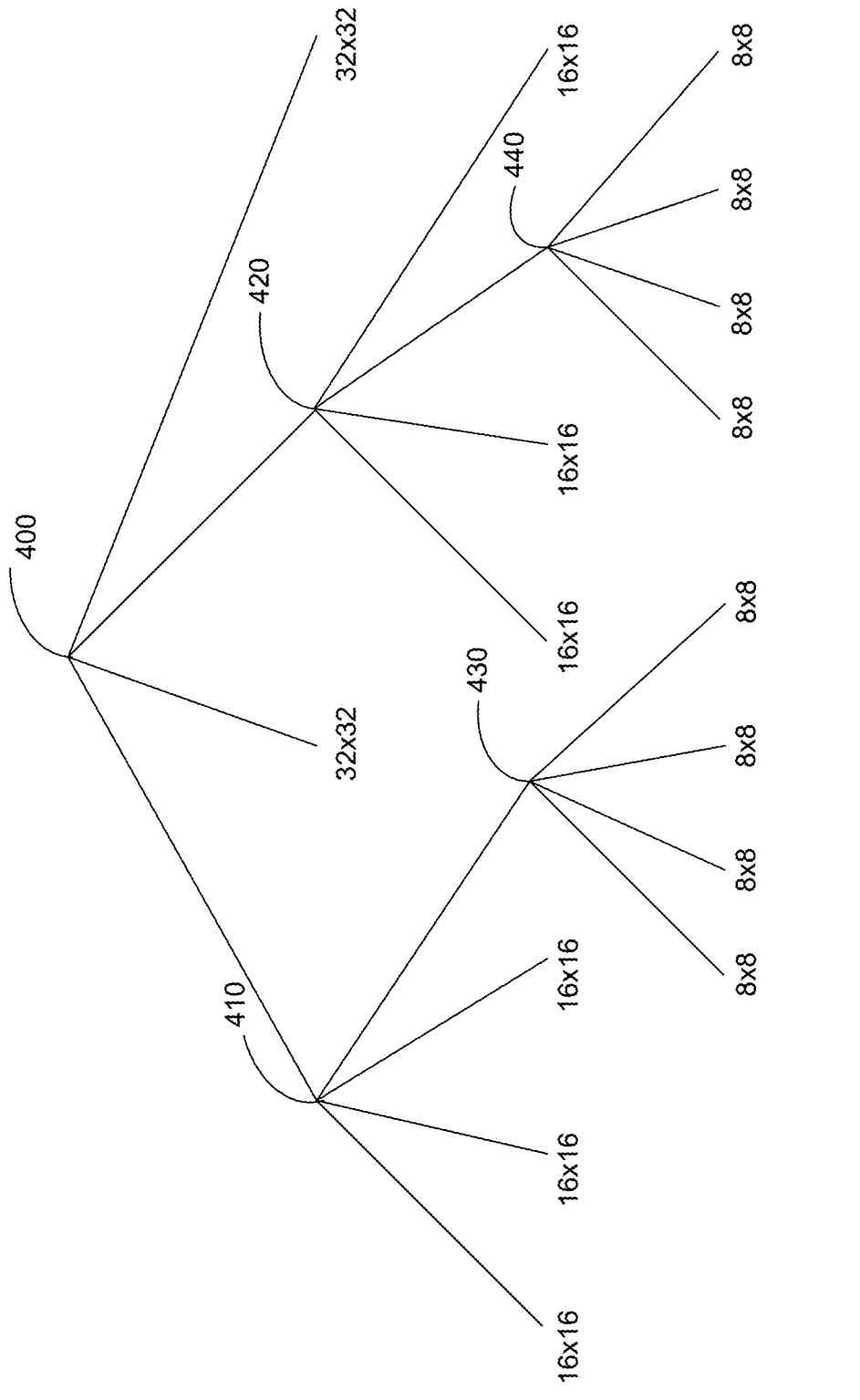
Figure 4E:
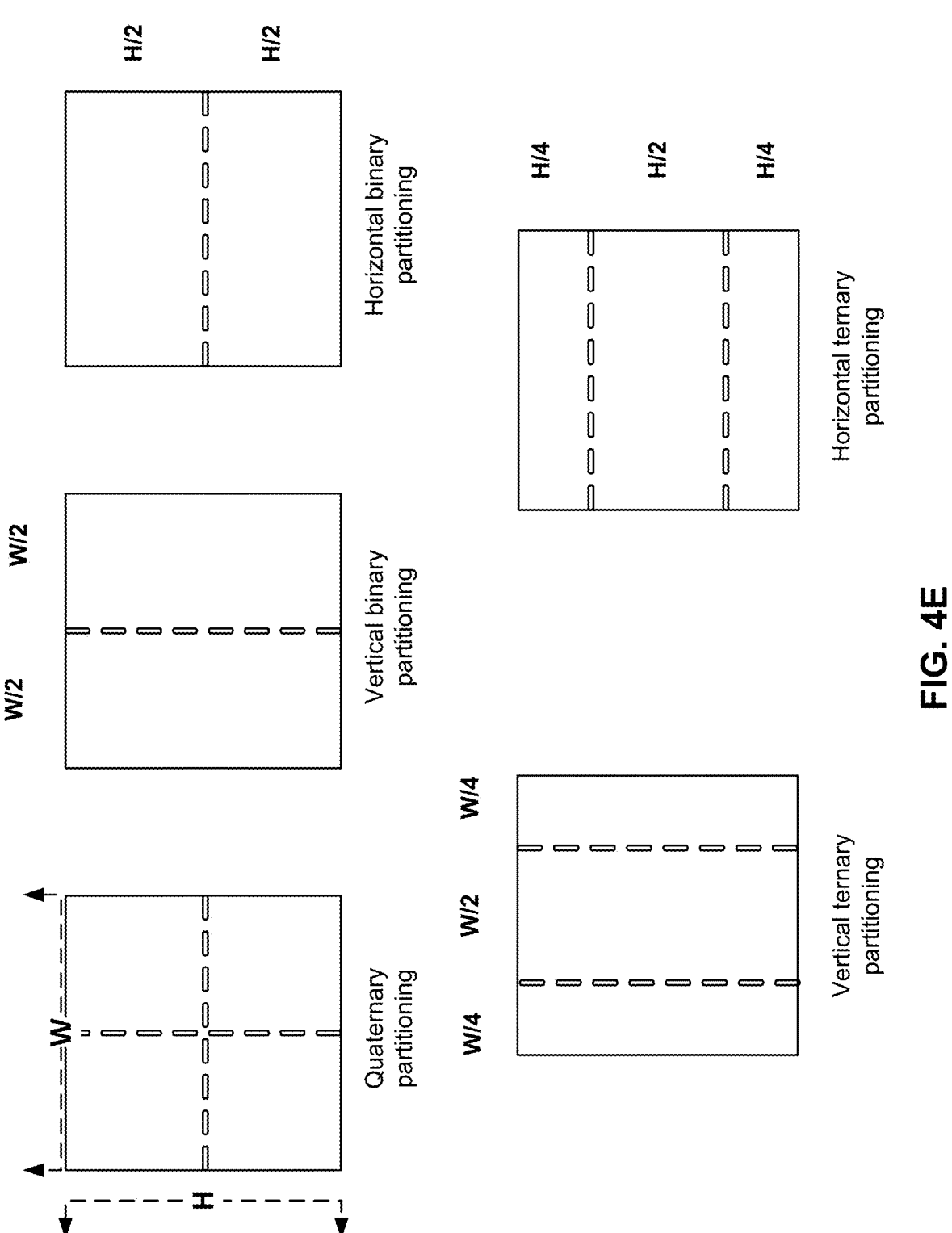

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a CB of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/ binary-tree partitions. In the multi-type tree structure, one CTU is partitioned by a quad-tree structure and each quad-tree leaf CU can be further partitioned by a binary and ternary tree structure. As shown in FIG. 4E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may comprise a PB of luma samples, two corresponding PBs of chroma samples, and syntax elements used to predict the PBs. In monochrome pictures or pictures having three separate color planes, a PU may comprise a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit 42 as described above in connection with FIG. 2, the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

In some implementations, each inter-prediction CU has three motion vector prediction modes including inter (which is also referred to as "advanced motion vector prediction" (AMVP)), skip, and merge for constructing the motion vector candidate list. Under each mode, one or more motion vector candidates may be added to the motion vector candidate list according to the algorithms described below. Ultimately one of them in the candidate list is used as the best motion vector predictor of the inter-prediction CU to be encoded into the video bitstream by video encoder 20 or decoded from the video bitstream by video decoder 30. To find the best motion vector predictor from the candidate list, a motion vector competition (MVC) scheme is introduced to select a motion vector from a given candidate set of motion vectors, i.e., the motion vector candidate list, that includes spatial and temporal motion vector candidates.

After one MVP candidate is selected within the given candidate set of motion vectors for a current CU, video encoder 20 may generate one or more syntax elements for the corresponding MVP candidate and encode them into the video bitstream such that video decoder 30 can retrieve the MVP candidate from the video bitstream using the syntax elements. Depending on the specific mode used for constructing the motion vectors candidate set, different modes (e.g., AMVP, merge, skip, etc.) have different sets of syntax elements. For the AMVP mode, the syntax elements include inter prediction indicators (e.g., List0, List1, or bi-directional prediction), reference indices, motion vector candidate indices, motion vector differences and prediction residual signal, etc. For the skip mode and the merge mode, only merge indices are encoded into the bitstream because the current CU inherits the other syntax elements including the inter prediction indicators, reference indices, and motion vectors from a neighboring CU referred by the coded merge index. In the case of a skip coded CU, the motion vector prediction residual signal is also omitted.

In general, the basic intra prediction scheme applied in VVC is almost kept the same as that of HEVC, except that several prediction tools are further extended, added and/or improved, e.g., extended intra prediction with wide-angle intra modes, Multiple Reference Line (MRL) intra prediction, Position-Dependent intra Prediction Combination (PDPC), Intra Sub-Partition (ISP) prediction, Cross-Component Linear Model (CCLM) prediction, and Matrix weighted Intra Prediction (MIP).

Figure 5A:
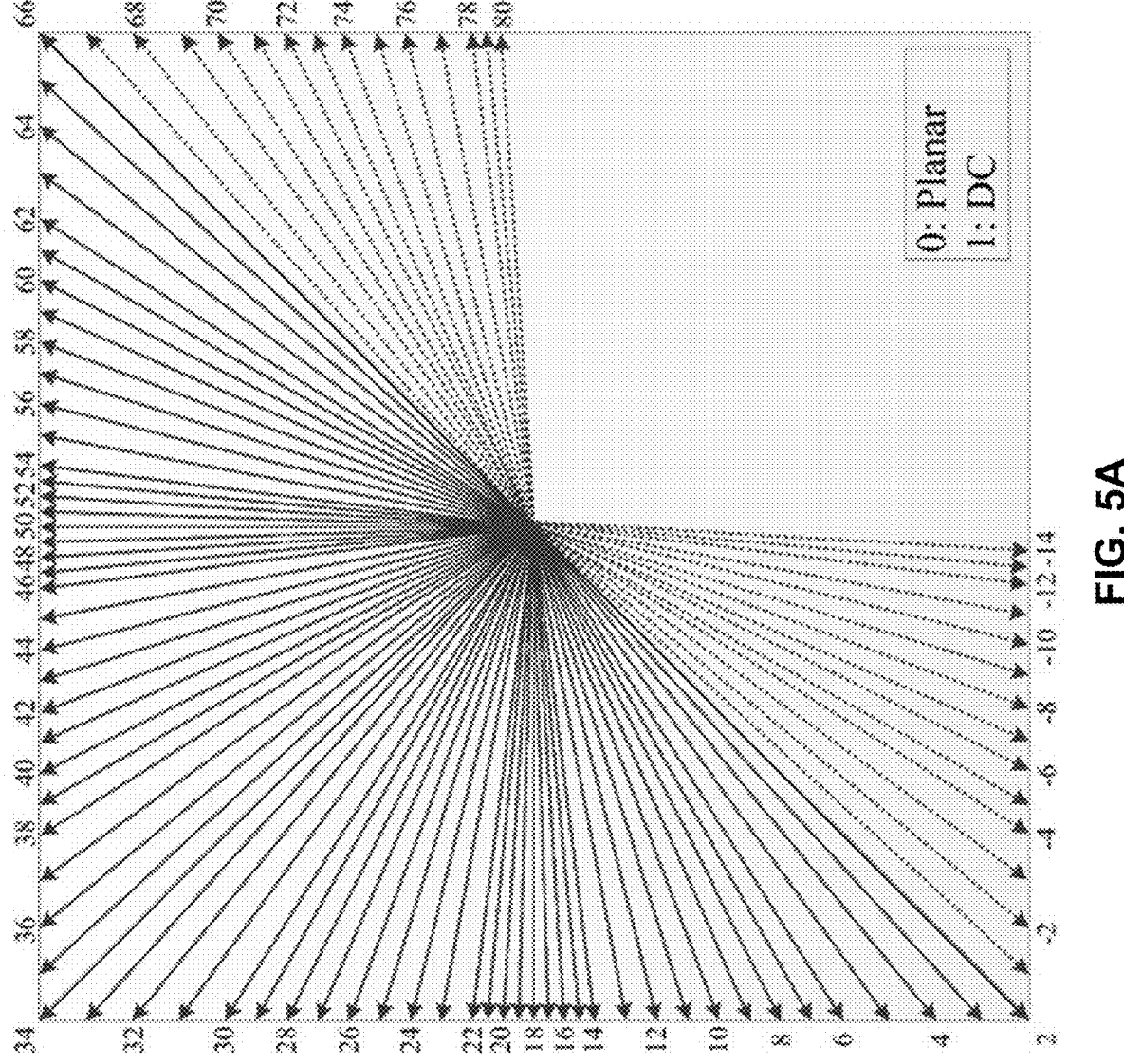
FIG. 5A is a block diagram illustrating intra modes as defined in VVC.

Like HEVC, VVC uses a set of reference samples neighboring a current CU (i.e., above the current CU or left to the current CU) to predict samples of the current CU. However, to capture finer edge directions present in natural video (especially for video content in high resolutions, e.g., 4K), a number of angular intra modes is extended from 33 in HEVC to 93 in VVC. FIG. 5A is a block diagram illustrating intra modes as defined in VVC. As shown in FIG. 5A, among the 93 angular intra modes, modes 2 to 66 are conventional angular intra modes, and modes −1 to −14 and modes 67 to 80 are wide-angle intra modes. In addition to the angular intra modes, the planar mode (mode 0 in FIG. 5A) and Direct Current (DC) mode (mode 1 in FIG. 5A) of HEVC are also applied in VVC.

As shown in FIG. 4E, since a quad/binary/ternary tree partition structure is applied in VVC, besides video blocks in square shape, rectangular video blocks also exist for the intra prediction in VVC. Due to unequal width and height of one given video block, various sets of angular intra modes may be selected from the 93 angular intra modes for different block shapes. More specifically, for both square and rectangular video blocks, besides planar and DC modes, 65 angular intra modes among the 93 angular intra modes are also supported for each block shape. When a rectangular block shape of a video block satisfies a certain condition, an index of a wide-angle intra mode of the video block may be adaptively determined by the video decoder 30 according to an index of a conventional angular intra mode received from the video encoder 20 using a mapping relationship as shown in Table 1 below. That is, for non-square blocks, the wide-angle intra modes are signaled by the video encoder 20 using the indexes of the conventional angular intra modes, which are mapped to indexes of the wide-angle intra modes by the video decoder 30 after being parsed, thus ensuring that a total number (i.e., 67) of intra modes (i.e., the planar mode, the DC mode and 65 angular intra modes among the 93 angular intra modes) is unchanged, and the intra-prediction mode coding method is unchanged. As a result, a good efficiency of signaling intra-prediction modes is achieved while providing a consistent design across different block sizes.

Figure 5B:
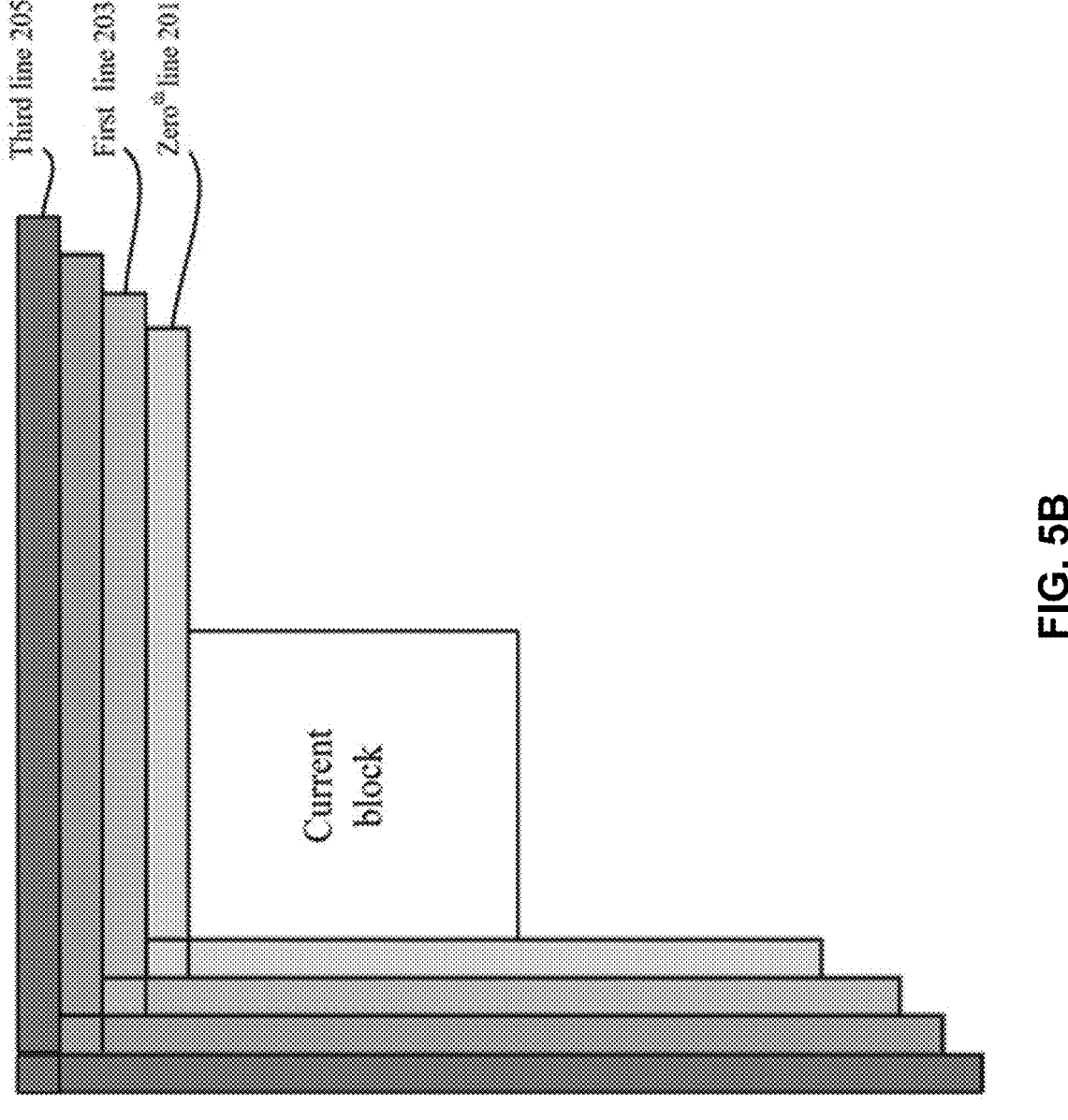
FIG. 5B is a block diagram illustrating multiple reference lines for intra prediction.

Table 1 shows a mapping relationship between indexes of conventional angular intra modes and indexes of wide-angle intra modes for the intra prediction of different block shapes in VVC, wherein W represents a width of a video block, and H represents a height of the video block.

a third line 205 in FIG. 5B) may be used for the intra prediction. An index of a selected row/column of reference samples is signaled from the video encoder 20 to the video decoder 30. When a non-nearest row/column of reference samples (i.e., the first line 203 or the third line 205 in FIG. 5B) is selected, the planar mode is excluded from a set of intra modes that may be used to predict the current video block. The MRL intra prediction is disabled for a first row/column of video blocks inside a current CTU to prevent using extended reference samples outside the current CTU.

Subblock-Based Temporal Motion Vector Prediction (SbTMVP)

This application discloses methods, systems, and devices that improve the coding efficiency/video quality of Sub-block-based Temporal Motion Vector Prediction (SbTMVP) mode.

SbTMVP is an inter-prediction mode that is supported by VVC by predicting motion vectors at a sub-coding unit (sub-CU) level. For example, the size of a sub-CU can be 4×4 pixels or 8×8 pixels.

In some implementations, a subblock corresponds to one sub-CU. In some implementations, a subblock includes two or more sub-CUs. In some implementations, a sub-CU includes two or more subblocks.

It should be noted that for the implementations disclosed herein, the size of a subblock or the size of a sub-CU is not limited to a certain size.

Similar to the temporal motion vector prediction (TMVP) in HEVC, SbTMVP uses the motion field in a collocated picture to improve motion vector prediction and merge mode for CUs in a current picture and the same collocated picture used by TMVP is used for SbTMVP. But SbTMVP differs from TMVP in two main aspects: (i) TMVP predicts motion at CU level whereas SbTMVP predicts motion at sub-CU level and (ii) TMVP fetches the temporal motion vectors from the collocated block in the collocated picture

TABLE 1

| Block shape | Aspect ratio | Indexes of conventional angular intra modes | Indexes of wide-angle intra modes |
|---|---|---|---|
| Square, W = H | W/H == 1 | None | None |
| Flat rectangle, W > H | W/H == 2 | 2, 3, 4, 5, 6, 7, 8, 9 | 67, 68, 69, 70, 71, 72, 73, 74 |
|  | W/H == 4 | 2, 3, 4, 5, 6, 7, 8, 9, 10, 11 | 67, 68, 69, 70, 71, 72, 73, 74, 75, 76 |
|  | W/H == 8 | 2, 3, 4, 5, 6, 7, 8, 9, 10, 11, 12, 13 | 67, 68, 69, 70, 71, 72, 73, 74, 75, 76, 77, 78 |
|  | W/H == 16 | 2, 3, 4, 5, 6, 7, 8, 9, 10, 11, 12, 13, 14, 15 | 67, 68, 69, 70, 71, 72, 73, 74, 75, 76, 77, 78, 79, 80 |
| Tall rectangle, W < H | W/H == 1/2 | 59, 60, 61, 62, 63, 64, 65, 66 | −8, −7, −6, −5, −4, −3, −2, −1 |
|  | W/H == 1/4 | 57, 58, 59, 60, 61, 62, 63, 64, 65, 66 | −10, −9, −8, −7, −6, −5, −4, −3, −2, −1 |
|  | W/H == 1/8 | 55, 56, 57, 58, 59, 60, 61, 62, 63, 64, 65, 66 | −12, −11, −10, −9, −8, −7, −6, −5, −4, −3, −2, −1 |
|  | W/H == 1/16 | 53, 54, 55, 56, 57, 58, 59, 60, 61, 62, 63, 64, 65, 66 | −14, −13, −12, −11, −10, −9, −8, −7, −6, −5, −4, −3, −2, −1 |

Similarly to the intra prediction in HEVC, all the intra modes (i.e., planar, DC and angular intra modes) in VVC utilize a set of reference samples above and left to a current video block for intra prediction. However, differently from HEVC where only the nearest row/column (i.e., a zero$^{th}$ line 201 in FIG. 5B) of reference samples are used, MRL intra prediction is introduced in VVC where in addition to the nearest row/column of reference samples, two additional rows/columns of reference samples (i.e., a first line 203 and (e.g., the collocated block is the bottom-right or center block in the collocated picture relative to the current CU in the current picture), whereas SbTMVP applies a motion shift before fetching the temporal motion information from the collocated picture, where the motion shift is obtained from the motion vector from one of the spatial neighboring blocks of the current CU.

FIGS. 6A to 6D illustrate the SbTMVP process according to some implementations.

Figure 6A:
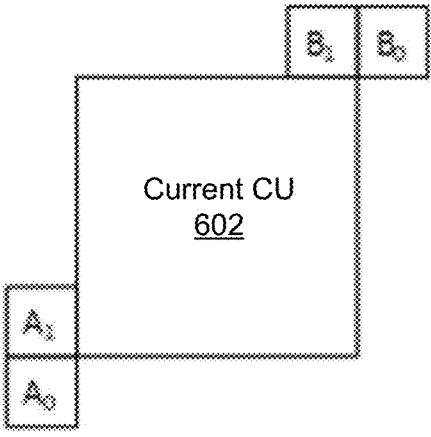
FIGS. 6A, 6B, 6C and 6D are block diagrams illustrating the SbTMVP process according to some implementations.
Figure 6B:
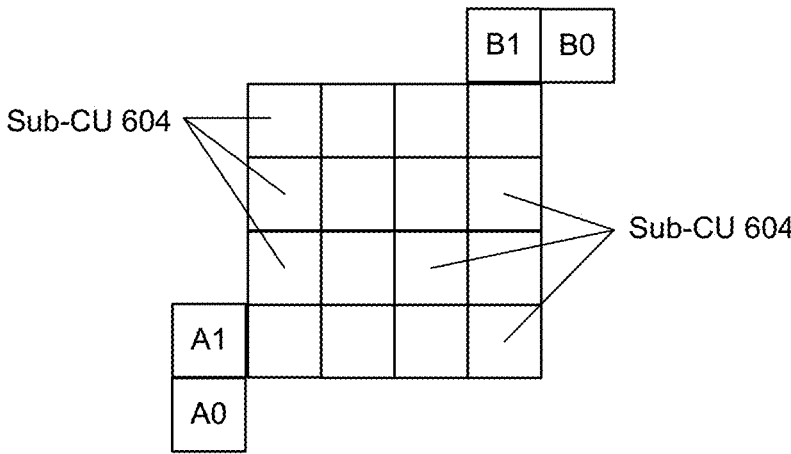

FIG. 6A illustrates a current CU 602. FIG. 6B illustrates that the current CU 602 is divided into a plurality of sub-CUs 604 (e.g., subblocks). For example, the current CU 602 is divided into 16 (e.g., 4×4) sub-CUs 604. It should be apparent to one of ordinary skill in the art that the number of sub-CUs in FIG. 6B is merely exemplary. In actual applications, the current CU can be divided any number of sub-CUs.

In some implementations, SbTMVP predicts the motion vectors of the plurality of sub-CUs within a current CU based on the following steps:

Step 1. Divide the current CU onto multiple sub-CUs. This is illustrated in FIGS. 6A and 6B.

Step 2. Derive the motion shift from the collocated picture of the current picture. Using the spatial neighbor A1 depicted in FIG. 6A as an example, if A1 has a motion vector that uses the same collocated picture as its reference picture, this motion vector is selected to be the motion shift to be applied. If no such motion is identified, then the motion shift is set to (0, 0).

Figure 6C:
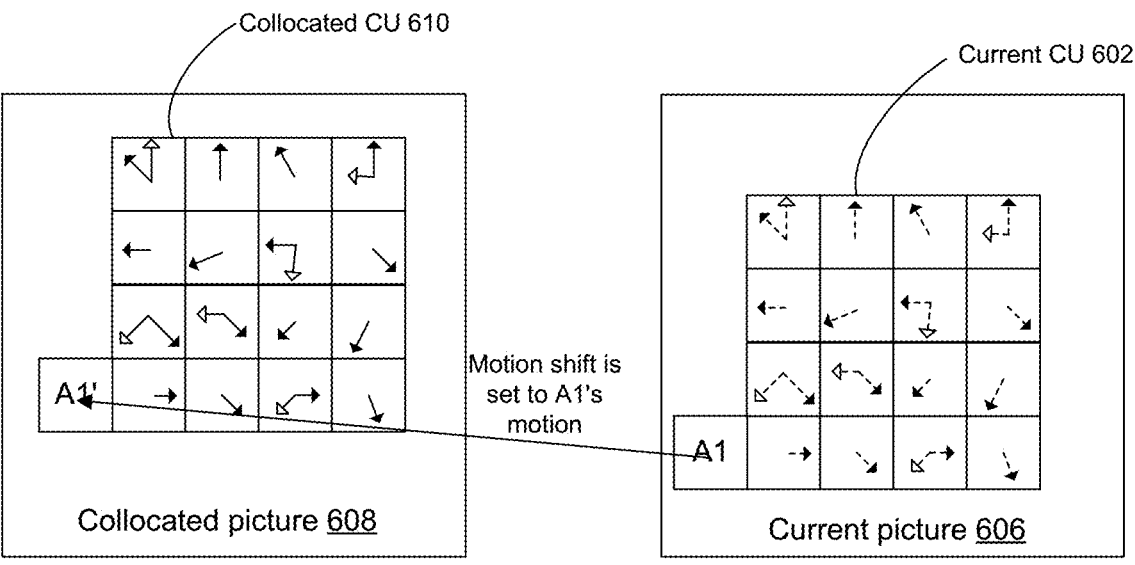

Step 3. Apply the motion shift derived from the collocated picture to the current picture by adding the motion shift to the current block's coordinates. Stated another way, for this step, the motion shift identified in Step 2 is applied (i.e., added to the coordinates of the current block) to obtain sub-CU-level motion information (e.g., motion vectors and reference indices) from the collocated picture. As illustrated in FIG. 6C, it is assumed that the motion shift is set to block A1's motion. Then, for each sub-CU of the current CU 602, the motion information of its corresponding block (the smallest motion grid that covers the center sample) in the collocated picture is used to derive the motion information for the sub-CU.

Step 4. Get initial vector 612 from the center of the collocated CU 610. See FIG. 6D.

Figure 6D:
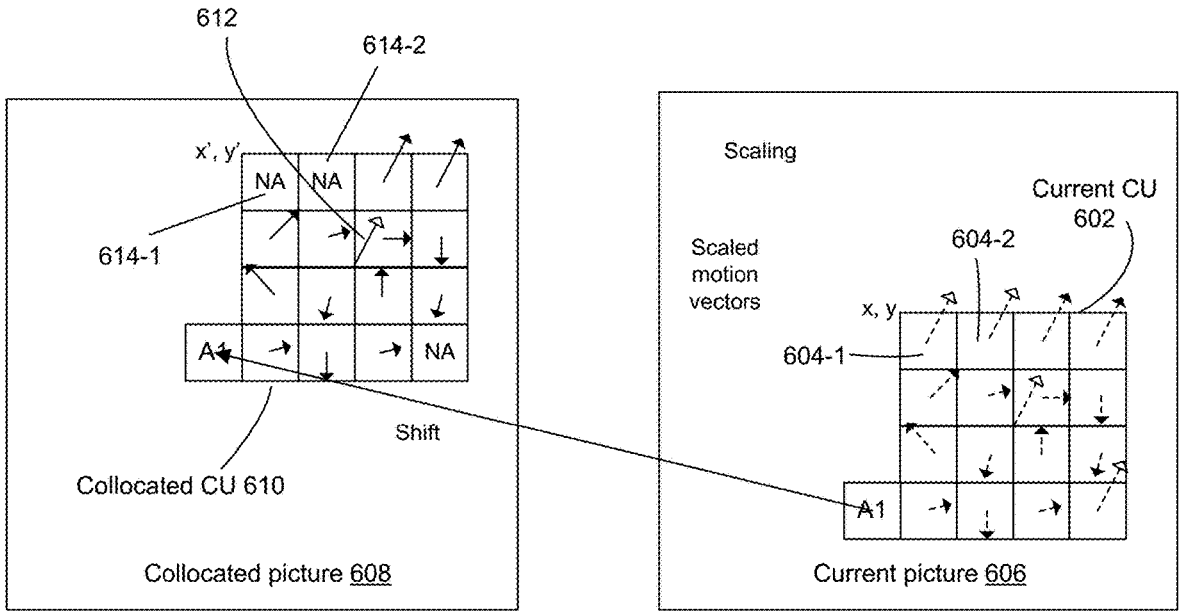

Step 5. Identify sub-CU motion information (from the center of sub-CU). For any sub-CUs with unavailable motion information, use the initial vector 612 as the default motion vector for the sub-CUs. For example, FIG. 6D illustrates that collocated CU 610 includes blocks (e.g., collocated sub-CUs) 614-1 and 614-2 identified as "NA", meaning that their motion information is unavailable. In this case, the motion shifts in the sub-CUs 604-1 and 604-2 of the current CU 602 are set to that of the motion vector 612 at the center of the collocated CU 610.

Figure 7:
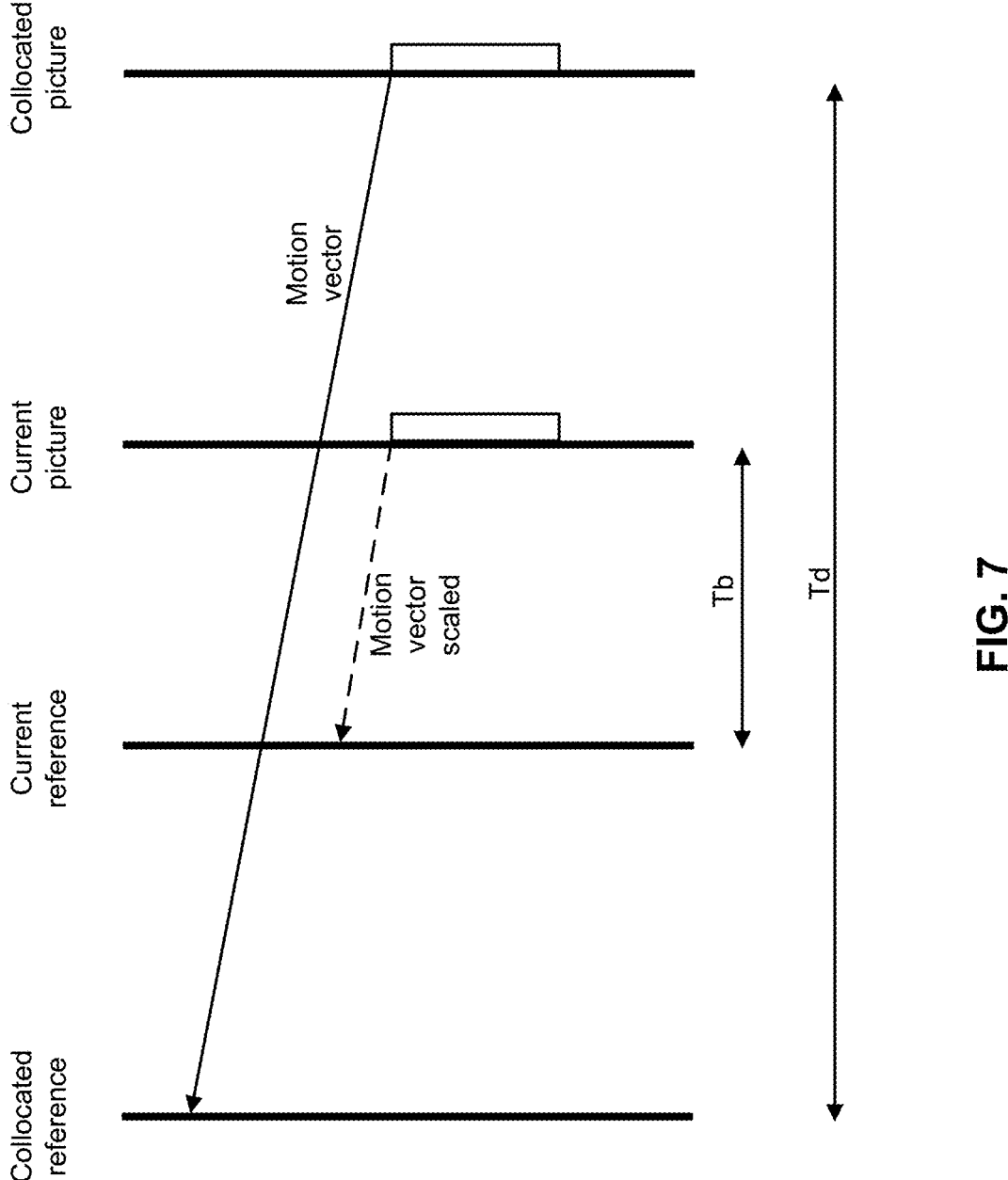
FIG. 7 is a diagram illustrating motion vector scaling according to some implementations.

Step 6. Derive sub-CU motion vectors and reference indices by applying scaling for corresponding sub-blocks. FIG. 7 illustrates motion vector scaling by using picture of count (POC) differences "Tb" and "Td", where "Td" denotes the difference between a collocated picture and a collocated reference and "Tb" denotes the difference between a current picture and a current reference. In some implementations, after the motion information of the collocated sub-CU is identified, it is converted to the motion vectors and reference indices of the current sub-CU in a similar way as the TMVP process of HEVC, where temporal motion scaling based on Tb and Td is applied to align the reference pictures of the temporal motion vectors to those of the current CU.

In some implementations, the collocated picture 608 is assumed to be known for the current picture 606 before the execution of the SbTMVP process. For example, the collocated picture is typically one reference picture of the current picture, which is selected from one of the two reference picture lists of the current picture, e.g., List0 and List1. In some implementations, the corresponding block is the one at the same relative position in the collocated picture as the current CU in the current picture. In some other implementations, the corresponding block is not necessarily the one at the same relative position in the collocated picture as the current CU in the current picture. Instead, there is a temporal vector linking the center of the current CU in the current picture to the center of the corresponding block in the collocated picture.

In some implementations, the SbTMVP process is implemented as part of the process of constructing a motion vector candidate list described above for a current CU during video encoding. In other words, if it is determined to that the current CU is to be processed using the SbTMVP, a parameter corresponding to the SbTMVP is added to the motion vector candidate list accordingly. In some other implementations, the SbTMVP process is implemented independently from the process of constructing a motion vector candidate list described above for a current CU during video encoding. In other words, the SbTMVP is treated as a separate inter-prediction mode like the aforementioned inter-prediction modes. Due to the symmetric nature between the encoding process and the decoding process, the rest of the present application uses the decoding of a current CU to illustrate how the SbTMVP process is employed for predicting the temporal motion vector of the current CU.

In some implementations, a combined subblock based merge list which contains both SbTMVP candidate and affine merge candidates is used for the signaling of subblock based merge mode. In some implementations, the SbTMVP mode can be enabled or disabled by a sequence parameter set (SPS) flag. If the SbTMVP mode is enabled, the SbTMVP predictor is added as the first entry of the list of subblock based merge candidates, followed by the affine merge candidates. The size of subblock based merge list is signaled in SPS and the maximum allowed size of the subblock based merge list is 5 in VVC.

In some implementations, the encoding logic of the additional SbTMVP merge candidate is the same as for the other merge candidates, that is, for each CU in P or B slice, an additional RD check is performed to decide whether to use the SbTMVP candidate.

Reducing the SbTMVP sub-CU motion compensation (MC) size (e.g., from 8×8 pixels to 4×4 pixels) can lead to better compression efficiency. However, enabling SbTMVP at smaller sub-CU sizes can introduce noticeable subblock boundary artifacts, especially for slices coded at high quantization parameter values. In those slices, the encoder (e.g., video encoder 20) tends to select modes with lower bit cost, e.g., skip mode which does not transmit prediction residuals, and hence worsen the subblock boundary artifacts.

Figure 8C:
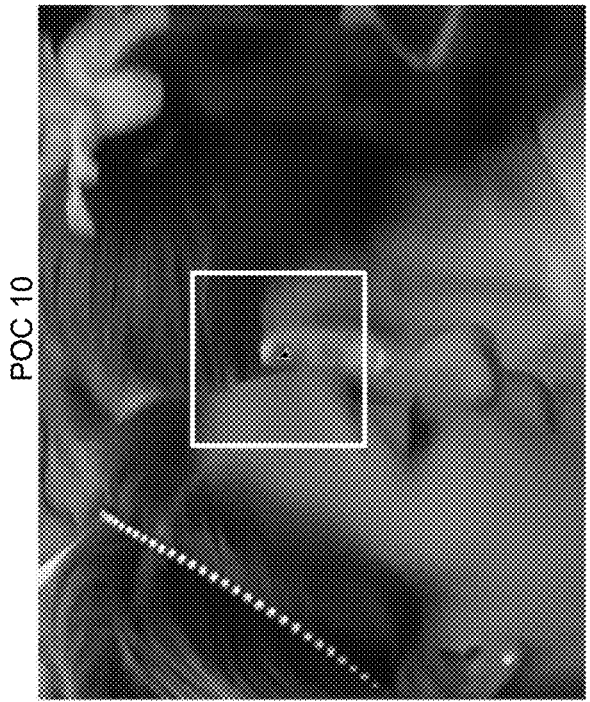
FIGS. 8A, 8B and 8C illustrate an example of subblock boundary artifact in a video bitstream, in accordance with some implementations.
Figure 8B:
Figure 8A:
Figure 9:
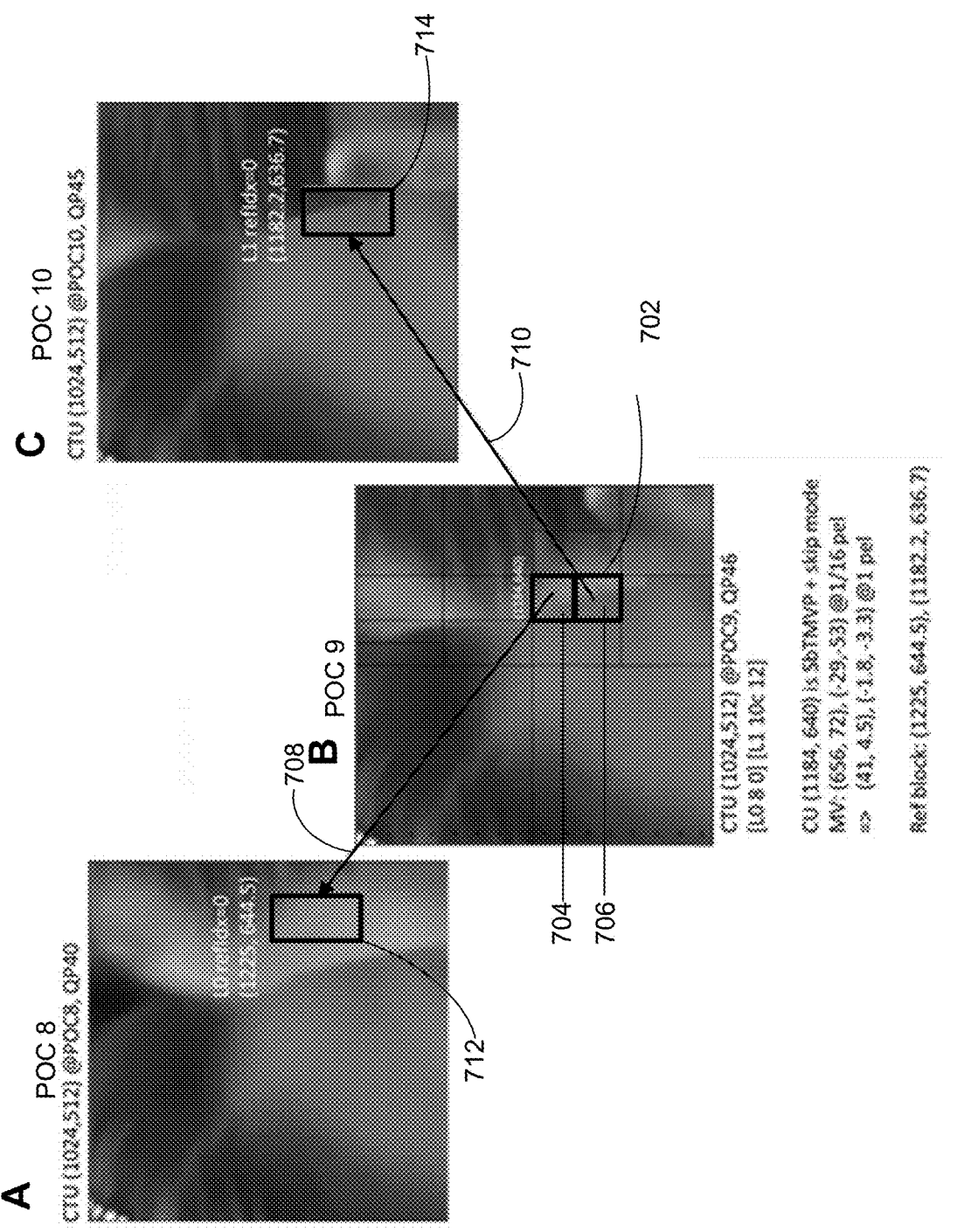
FIG. 9 illustrates an example of subblock boundary artifact in a video bitstream, in accordance with some implementations.
Figure 10:
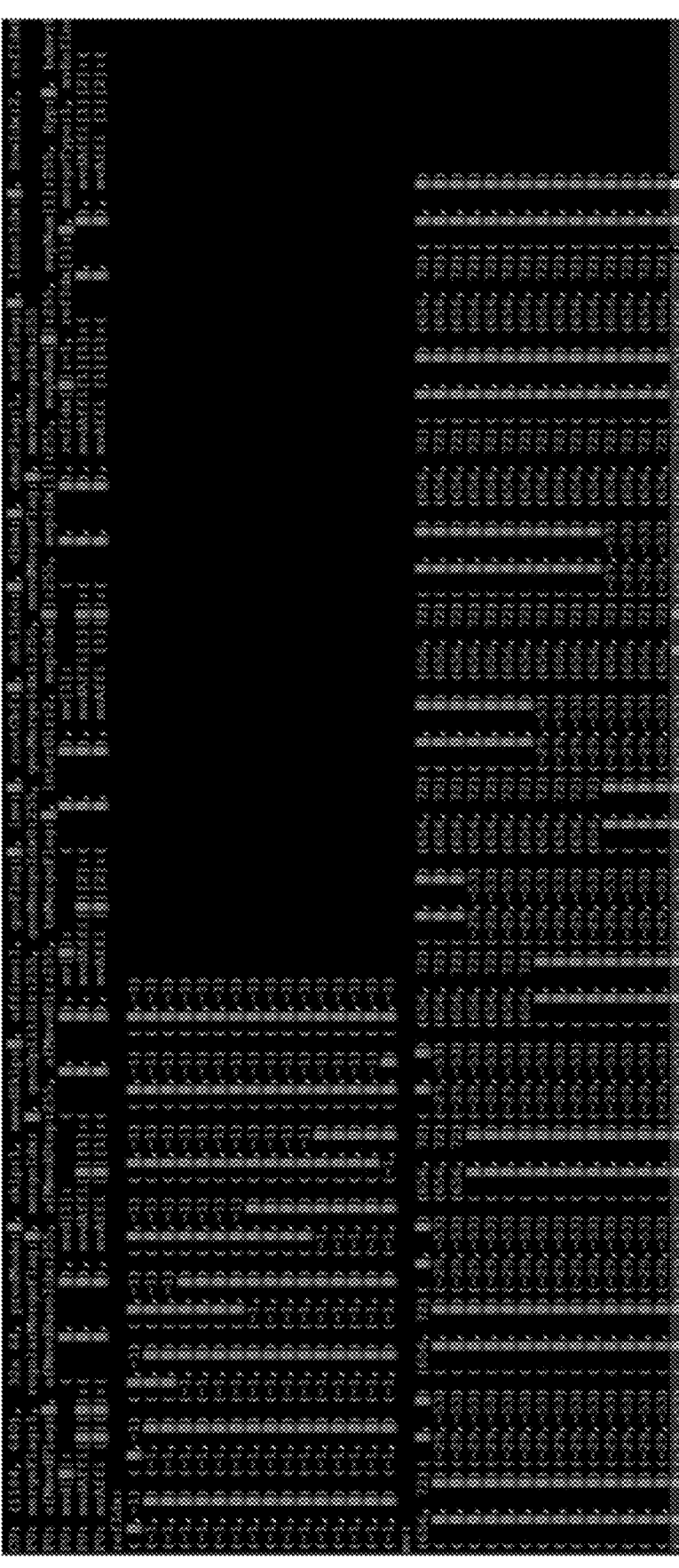
FIG. 10 illustrates a decoder log according to some implementations.

FIGS. 8A-8C and FIG. 9 illustrate an example of subblock boundary artifact in a video bitstream, in accordance with some implementations. FIGS. 8A, 8B, and 8C represent three consecutive POCs of a video bitstream showing two persons walking past each other. Section A, Section B and Section C of FIG. 9 show, respectively, higher magnification images of the regions defined by the boxes in FIGS. 8A to 8C. The current CU in FIG. 8B and Section B of FIG. 9 (POC 9) is enabled as SbTMVP with skip mode. The decoder log in FIG. 10 shows that the CU prediction samples come from right unidirectionally-predicted subblocks (samples in POC 8, FIG. 8A and Section A of FIG. 9), left unidirectionally-predicted subblocks (samples in POC 10, FIG. 8C and Section C of FIG. 9), and diagonal bidirectionally-predicted subblocks (both samples in POC 8 and POC 10). Section B of FIG. 9 shows an irregular jagged visual artifact running diagonally from the top left to the bottom right of the box 702. Such a visual artifact may arise from quite different motions between subblocks (e.g., for the diagonal subblocks). The artifact may worsen in slices/CUs where the quantization parameter values are high (e.g., higher than a threshold value).

Accordingly, there is a need for improved methods, systems, and devices for improving the coding efficiency/ video quality of the SbTMVP mode, to reduce or eliminate artifacts, such as the subblock boundary artifact depicted in FIGS. 8A-8C and FIG. 9.

In accordance with some implementations of the present disclosure, the coding efficiency and/or video quality of SbTMVP can be improved by applying an image filter at the sub-CU level.

In some implementations, the image filter comprises a deblocking filter (DBF) (e.g., part of the in-loop filters 63). The DBF is to be enabled at sub-CU level. For example, the DBF aligns the sub-CU grid, which can be of sizes such as 256×256 pixels, 8×8 pixels, 4×4 pixels, 2×2 pixels, or any size smaller than or equivalent to a minimum CU size.

In some implementations, the deblocking filter can be also applied on other subblock-based coding modes, such as the affine mode, bidirectional optical flow (BDOF) mode, SbTMV mode, or the decoder-side motion vector refinement (DMVR) mode.

In some implementations, the DBF enabling condition depends on the current CU mode. For example, the video encoder 20 enables the DBF at sub-CU level when (e.g., or only when) the SbTMVP mode, affine mode, DMVR, BDOF or other coding mode requires sub-CU level motion compensation.

In some implementations, the mode for enabling sub-CU DBF can be predefined or controlled with flags in SPS/APS/PPS/PH/SH/sub-picture/region/CTU/CU/subblock/sample levels.

In some implementations, the DBF filter conditions can be further applied to target the "high risk" SbTMVP/affine/DMVR/BDOF CUs. For example, the video coder (e.g., encoder 20 and decoder 30) enables DBF at SbTMVP sub-CUs only when two subblock MVs have different reference indexes, and/or have motion vectors that have a large difference (e.g., larger than a predetermined threshold).

In some implementations, in SbTMVP mode, a current CU includes multiple subblocks. For each subblock i and its neighbor subblock j, the video coder enables a DBF across a subblock boundary between the subblock i and its adjacent subblock j if one or more of the following conditions are met:

$$\text{inter direction } i\text{!=inter direction } j, \quad (1)$$

i.e., subblock i has a motion vector whose direction is not the same as a direction of the motion vector corresponding to subblock j;

$$\text{refIdx\_}i\text{!=refIdx } j, \quad (2)$$

i.e., subblock i has a different reference index from subblock j;

$$\text{refPOC\_}i\text{!=refPOC\_}j, \quad (3)$$

i.e., subblock i has a reference POC that is different from a reference POC of subblock j;

$$|\text{MVHor\_}i-\text{MVHor\_}j|>\text{MVHor\_}th: \quad (4)$$

a difference between (i) a horizontal component of the motion vector of subblock i and (ii) a horizontal component of the motion vector of subblock j has a magnitude that exceeds a horizontal motion vector threshold magnitude; and $$|\text{MVVer\_}i-\text{MVVer\_}j|>\text{MVVer\_}th, \quad (5)$$

i.e., a difference between (i) a vertical component of the motion vector of subblock i and (ii) a vertical component of the motion vector of subblock j has a magnitude that exceeds a vertical motion vector threshold magnitude.

In some implementations, the motion vector threshold magnitudes (e.g., MVHor_th or MVVer_th) can be predefined or signaled in SPS/APS/PPS/PH/SH/sub-picture/region/CTU/CU/subblock/sample levels.

In some implementations, conditions (4) and (5) above can also be in the merged form:

$$\text{MVHor\_}i-\text{MVHor\_}j|+|\text{MVVer\_}i-\text{MVVer\_}j|>\text{MV\_}th, \quad (6)$$

with MV_th predefined or signaled in SPS/APS/PPS/PH/SH/sub-picture/region/CTU/CU/subblock/sample levels.

In accordance with some implementations of the present disclosure, the coding efficiency and/or video quality of SbTMVP can be improved by applying certain conditions to determine whether or not to enable the SbTMVP coding mode.

In some implementations, the video coder does not enable the SbTMVP mode for a current CU when any of two reference subblocks of a current sub-CU have quantization parameter (QP) values whose difference is larger than a threshold value (e.g., 6). Stated another way, the video coder enables the SbTMVP mode for a current CU when two reference subblocks have QP values whose difference is less than a threshold QP value. The QP regulates how much spatial detail is saved in the encoded in the video bitstream. When the QP value is small, most of the spatial detail is retained. As the QP value increases, some of that detail is aggregated so that the bit rate drops and the coding efficiency increases, but at the price of some increase in distortion and some loss of quality. In some implementations, the threshold QP value can be predefined or signaled in SPS/APS/PPS/PH/SH/sub-picture/region/CTU/CU/subblock/sample levels.

Referring again to FIG. 6C, in this example, the current CU 602 in the current picture 606 is divided into 16 sub-CUs. Each of the sub-CUs has one or more motion vectors relative to a respective reference sub-CU (e.g., the collocated CU 610) in the reference picture (e.g., the collocated picture 608). In some implementations, a sub-CU has a motion vector with a unidirectional prediction direction (e.g., the sub-CU has one motion vector). In some implementations, a sub-CU has two or more motion vectors, each corresponding to a respective collocated picture (e.g., the sub-CU includes motion vectors with a bidirectional or multi-directional prediction direction).

In some implementations, a sub-CU corresponds to one or more reference subblocks (e.g., reference sub-CUs) located in one or more respective collocated reference pictures. In some implementations, each reference subblock has its own coded QP value (typically equal to slice QP).

In some implementations, the video coder enables SbTMVP mode for a current CU in accordance with a determination that a difference between (i) a first (QP) value for a first reference subblock and (ii) a second QP value for a second reference subblock is within a threshold QP value difference, i.e., $|QPi-QPj|\leq QPth$, where $i\neq i$.

In some implementations, the video coder enables SbTMVP mode for a current CU in accordance with a determination that motion vectors corresponding to all the subblocks of the current CU have the same prediction direction.

Using Section B of FIG. 9 as an example, assume that the box 702 corresponds to a current CU that includes a subblock (e.g., sub-CU) 704 and a subblock (e.g., sub-CU) 706. The subblock 704 includes a motion vector 708 pointing toward subblock 712 in Section A of FIG. 9 (collocated picture/POC 8). The subblock 706 includes a motion vector 710 pointing toward subblock 714 in Section C of FIG. 9 (collocated picture/POC 10). In this case, because the current CU 702 includes two neighboring subblocks with motion vectors that do not have the same prediction direction, consequently the video decoder 30 may not enable the SbTMVP mode for the current CU 702.

In some implementations, the video decoder 30 enables SbTMVP mode for a current CU in accordance with a determination that the motion vectors corresponding to the subblocks (e.g., sub-CUs) of the current CU have the same reference index.

In some implementations, the video decoder 30 enables SbTMVP mode for a current CU in accordance with a determination that the motion vectors corresponding to the subblocks (e.g., sub-CUs) of the current CU have the reference POC (e.g., collocated picture).

Table 2 illustrates exemplary syntax according to some implementations. Note that different binarization methods can be used for encoding the syntax elements, including:

FLC: fixed length code; or

TU: truncated unary code; or

EGk: exponential-golomb code with order k, where k can be fixed.

In some implementations, while decoding (1104) a current CU of the video bitstream, the current CU having a plurality of reference subblocks located in one or more reference pictures, the video decoder 30 determines whether the plurality of reference subblocks satisfy a first set of predefined conditions for enabling a subblock-based temporal motion vector prediction (SbTMVP) mode. For example, in some implementations, the first set of predefined conditions are described above in connection with various constraints on coding modes requiring sub-CU Level motion compensation.

In some implementations, in accordance with a determination (1106) that the plurality of reference subblocks satisfy the first set of predefined conditions for enabling the subblock-based temporal motion vector prediction (SbTMVP) mode, the video decoder 30 retrieves (1108), from the video bitstream, syntax elements associated with the SbTMVP mode. The video decoder 30 decodes (1110) the current CU using the retrieved syntax elements associated with the SbTMVP mode.

In some implementations, the video decoder 30 determines that the plurality of reference subblocks satisfy the first set of predefined conditions for enabling the SbTMVP mode by determining that a difference between (i) a first quantization parameter (QP) value for a first reference subblock of the plurality of reference subblocks and (ii) a second QP value for a second reference subblock of the

TABLE 2

| | Example Syntax | | |
|---|---|---|---|
| Level | Syntax element | Binarization | Meaning |
| SPS | sbtmvp_dbf_enable | FLC | Whether to apply sub-CU DBF for SbTMVP |
| SPS | sbtmvp_subblk_qp_thr_enable | FLC | Whether to apply two reference subblocks QPs threshold constraint |
| PH/SH | sbtmvp_subblk_qp_thr | FLC | If any two subblock QPs > threshold value, do not allow SbTMVP |
| SPS | sbtmvp_subcu_mv_refine | FLC | Whether to apply SbTMVP sub-CU motion vectors refinement |
| PH/SH | sbtmvp_subcu_mv_refine_list01 | FLC | only using all sub-CUs' L0 or L1 MVs |

FIG. 11 illustrates a flowchart for a method 1100 of decoding a video bitstream according to some implementations. In some implementations, the method 1100 is performed by a video decoder 30. The video decoder includes one or more processors and memory. The memory stores one or more programs configured for execution by the one or more processors. In some implementations, the operations shown in FIGS. 1, 2, 3, 4A to 4D, 5A, to 5B, 6A to 6D, 7, 8A to 8C, 9, 10, and 12 correspond to instructions stored in the memory or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 1100 may be combined and/or the order of some operations may be changed.

The video decoder 30 acquires (1102) a video bitstream. The video bitstream includes data associated with multiple encoded pictures. Each encoded picture includes one or more coding units (CUs) (e.g., coding unit 602, coding unit 702).

plurality of reference subblocks is within a threshold QP value difference (e.g., the difference between the first quantization parameter and the second quantization parameter does not exceed, or is less than, or is less than or equal to, the threshold QP value difference).

In some implementations, the video decoder 30 determines that the plurality of reference subblocks satisfy the first set of predefined conditions for enabling the SbTMVP mode by determining that a plurality of motion vectors (e.g., at least of two motion vectors or all the motion vectors) corresponding to a plurality of sub-CUs of the current CU have a same prediction direction. For example, the video decoder determines that the plurality of motion vectors have the same unidirectional direction, or have the same bidirectional directions (e.g., each of the motion vectors is pointing toward the same two directions), or have the same multi-directional directions.

In some implementations, the video decoder 30 determines that the plurality of reference subblocks satisfy the first set of predefined conditions for enabling the SbTMVP mode by determining that each of the plurality of motion vectors has a same reference index. In some implementations, the motion field of a subblock (or sub-CU) can be defined as: Motion field=reference index+motion vector.

The reference index is the POC that the motion points to. Each of the motion vectors points from the current sub-block to one or more reference sub-blocks collocated to the current sub-block.

In some implementations, the video decoder 30 determines that the plurality of reference subblocks satisfy the first set of predefined conditions for enabling the SbTMVP mode by determining that the plurality of reference sub-blocks are located in a same reference picture of the one or more reference pictures.

In some implementations, after decoding the current CU using the retrieved syntax elements associated with the SbTMVP mode, the video decoder 30 identifies a first sub-CU and a second sub-CU within the current CU. The first and second sub-CUs are adjacent to each other. In accordance with a determination that the first sub-CU and the second sub-CU satisfy a second set of predefined conditions, the video decoder 30 performs a filter operation at a boundary between the first sub-CU and the second sub-CU.

In some implementations, the filter operation uses a deblocking filter. For example, the video decoder 30 applies a deblocking filter at a boundary between the first sub-CU and the second sub-CU.

In some implementations, performing the filter operation includes applying the deblocking filter at the boundary between the first sub-CU and the second sub-CU.

In some implementations, the method 1100 includes determining that the first sub-CU and the second sub-CU satisfy the second set of predefined conditions, including: determining that the first sub-CU corresponds to a first reference index and the second sub-CU corresponds to a second reference index, distinct from the first reference index.

In some implementations, the method 1100 includes determining that the first sub-CU and the second sub-CU satisfy the second set of predefined conditions, including: determining that the first sub-CU corresponds to a reference subblock located in a first reference picture and the second sub-CU corresponds to a reference subblock located in a second reference picture, distinct from the first reference picture.

In some implementations, the video decoder 30 determines that the first sub-CU and the second sub-CU satisfy the second set of predefined conditions, including: (i) determining a first motion vector corresponding to the first sub-CU; (ii) determining a second motion vector corresponding to the second sub-CU; and (iii) determining that a difference between the first motion vector and the second motion vector has a magnitude that exceeds a threshold magnitude.

In some implementations, determining that a difference between the first motion vector and the second motion vector has a magnitude that exceeds a threshold magnitude includes determining that a difference between a horizontal component of the first motion vector and a horizontal component of the second motion vector has a magnitude that exceeds a horizontal threshold magnitude.

In some implementations, determining that a difference between the first motion vector and the second motion vector has a magnitude that exceeds a threshold magnitude includes: determining that a difference between a vertical component of the first motion vector and a vertical component of the second motion vector has a magnitude that exceeds a vertical threshold magnitude.

Figure 12:
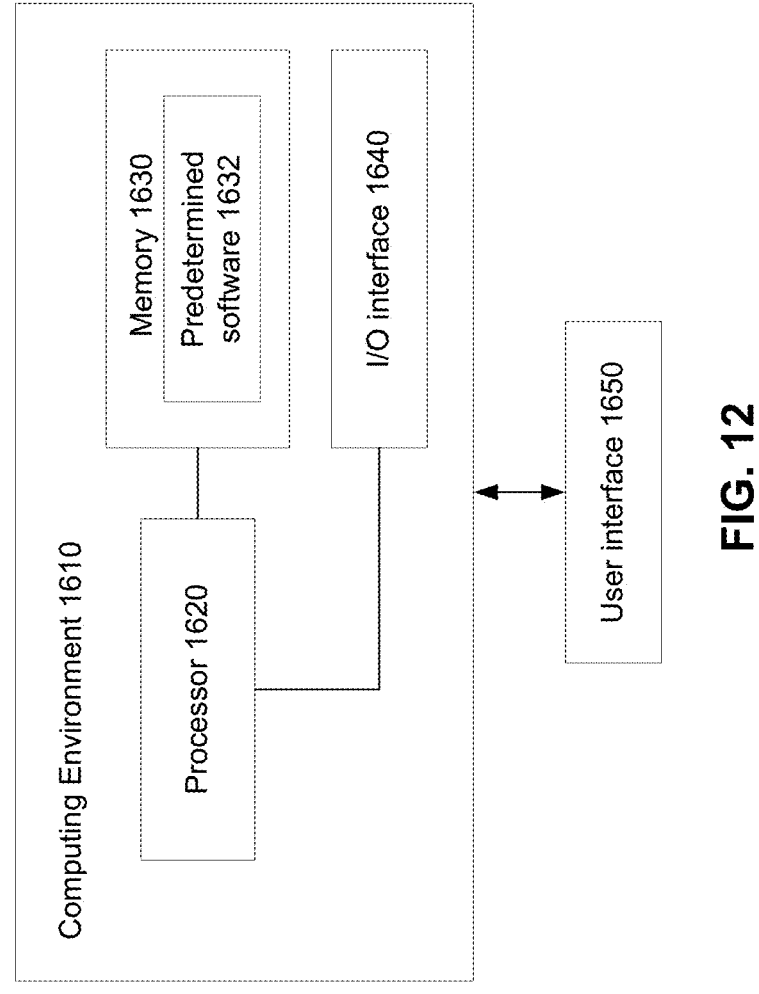
FIG. 12 is a diagram illustrating a computing environment coupled with a user interface, according to some implementations of the present disclosure.

FIG. 12 shows a computing environment 1610 coupled with a user interface 1650. The computing environment

1610 can be part of a data processing server. The computing environment 1610 includes a processor 1620, a memory 1630, and an Input/Output (I/O) interface 1640.

The processor 1620 typically controls overall operations of the computing environment 1610, such as the operations associated with display, data acquisition, data communications, and image processing. The processor 1620 may include one or more processors to execute instructions to perform all or some of the steps in the above-described methods. Moreover, the processor 1620 may include one or more modules that facilitate the interaction between the processor 1620 and other components. The processor may be a Central Processing Unit (CPU), a microprocessor, a single chip machine, a Graphical Processing Unit (GPU), or the like.

The memory 1630 is configured to store various types of data to support the operation of the computing environment 1610. The memory 1630 may include predetermined software 1632. Examples of such data includes instructions for any applications or methods operated on the computing environment 1610, video datasets, image data, etc. The memory 1630 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1640 provides an interface between the processor 1620 and peripheral interface modules, such as a keyboard, a click wheel, buttons, and the like. The buttons may include but are not limited to, a home button, a start scan button, and a stop scan button. The I/O interface 1640 can be coupled with an encoder and decoder.

In an embodiment, there is also provided a non-transitory computer-readable storage medium comprising a plurality of programs, for example, in the memory 1630, executable by the processor 1620 in the computing environment 1610, for performing the above-described methods. Alternatively, the non-transitory computer-readable storage medium may have stored therein a bitstream or a data stream comprising encoded video information (for example, video information comprising one or more syntax elements) generated by an encoder (for example, the video encoder 20 in FIG. 2) using, for example, the encoding method described above for use by a decoder (for example, the video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In an embodiment, the is also provided a computing device comprising one or more processors (for example, the processor 1620); and the non-transitory computer-readable storage medium or the memory 1630 having stored therein a plurality of programs executable by the one or more processors, wherein the one or more processors, upon execution of the plurality of programs, are configured to perform the above-described methods.

In an embodiment, there is also provided a computer program product comprising a plurality of programs, for example, in the memory 1630, executable by the processor 1620 in the computing environment 1610, for performing the above-described methods. For example, the computer program product may include the non-transitory computer-readable storage medium.

In an embodiment, the computing environment 1610 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method of video decoding, the method comprising:
acquiring a video bitstream, the video bitstream including data associated with multiple encoded pictures, each encoded picture including one or more coding units (CUs);
while decoding a current CU of the video bitstream, the current CU having a plurality of reference subblocks located in one or more reference pictures:
in accordance with a determination that a first set of predefined conditions for enabling a subblock-based temporal motion vector prediction (SbTMVP) mode are satisfied:
retrieving, from the video bitstream, syntax elements associated with the SbTMVP mode; and
decoding the current CU using the retrieved syntax elements associated with the SbTMVP mode;
wherein the first set of predefined conditions comprises at least one of the following conditions:
a difference between a first quantization parameter (QP) value for a first reference subblock of the plurality of reference subblocks and a second QP value for a second reference subblock of the plurality of reference subblocks is within a threshold QP value difference;
a plurality of motion vectors corresponding to a plurality of sub-CUs of the current CU have a same prediction direction;
each of the plurality of motion vectors corresponding to the plurality of sub-CUs of the current CU has a same reference index; and
the plurality of reference subblocks are located in a same reference picture of the one or more reference pictures.

2. The method of claim 1, further comprising:
after decoding the current CU using the retrieved syntax elements associated with the SbTMVP mode:
identifying a first sub-CU and a second sub-CU within the current CU, the first and second sub-CUs being adjacent to each other; and
in accordance with a determination that the first sub-CU and the second sub-CU satisfy a second set of predefined conditions, performing a filter operation at a boundary between the first sub-CU and the second sub-CU.

3. The method of claim 2, wherein the filter operation uses a deblocking filter.

4. The method of claim 3, wherein the performing the filter operation comprises applying the deblocking filter at the boundary between the first sub-CU and the second sub-CU.

5. The method of claim 2, wherein
the determination that the first sub-CU and the second sub-CU satisfy the second set of predefined conditions comprises:
determining that the first sub-CU corresponds to a first reference index and the second sub-CU corresponds to a second reference index, distinct from the first reference index.

6. The method of claim 2, wherein
the determination that the first sub-CU and the second sub-CU satisfy the second set of predefined conditions comprises:
determining that the first sub-CU corresponds to a reference subblock located in a first reference picture and the second sub-CU corresponds to a reference subblock located in a second reference picture, distinct from the first reference picture.

7. The method of claim 2, wherein
the determination that the first sub-CU and the second sub-CU satisfy the second set of predefined conditions comprises:
determining a first motion vector corresponding to the first sub-CU;
determining a second motion vector corresponding to the second sub-CU; and
determining that a difference between the first motion vector and the second motion vector has a magnitude that exceeds a threshold magnitude.

8. The method of claim 7, wherein the determining that the difference between the first motion vector and the second motion vector has the magnitude that exceeds the threshold magnitude further comprises:
determining that a difference between a horizontal component of the first motion vector and a horizontal component of the second motion vector has a magnitude that exceeds a horizontal threshold magnitude.

9. The method of claim 7, wherein the determining that the difference between the first motion vector and the second motion vector has the magnitude that exceeds the threshold magnitude further comprises:
determining that a difference between a vertical component of the first motion vector and a vertical component of the second motion vector has a magnitude that exceeds a vertical threshold magnitude.

10. A computer system, comprising:
one or more processors; and
memory storing one or more programs configured for execution by the one or more processors, the one or more programs comprising instructions for performing a method of video decoding comprising:

acquiring a video bitstream, the video bitstream including data associated with multiple encoded pictures, each encoded picture including one or more coding units (CUs);

while decoding a current CU of the video bitstream, the current CU having a plurality of reference subblocks located in one or more reference pictures:

in accordance with a determination that a first set of predefined conditions for enabling a subblock-based temporal motion vector prediction (SbTMVP) mode are satisfied:

retrieving, from the video bitstream, syntax elements associated with the SbTMVP mode; and decoding the current CU using the retrieved syntax elements associated with the SbTMVP mode;

or the one or more programs comprising instructions for performing a method of video encoding comprising:

while encoding a current coding units (CU) of one or more CUs of each of multiple pictures, the current CU having a plurality of reference subblocks located in one or more reference pictures:

in accordance with a determination that a first set of predefined conditions for enabling a subblock-based temporal motion vector prediction (SbTMVP) mode are satisfied:

encoding the current CU using the SbTMVP mode; and signaling, into a video bitstream, the syntax elements associated with the SbTMVP mode;

wherein the first set of predefined conditions comprises at least one of the following conditions:

a difference between a first quantization parameter (QP) value for a first reference subblock of the plurality of reference subblocks and a second QP value for a second reference subblock of the plurality of reference subblocks is within a threshold QP value difference;

a plurality of motion vectors corresponding to a plurality of sub-CUs of the current CU have a same prediction direction;

each of the plurality of motion vectors corresponding to the plurality of sub-CUs of the current CU has a same reference index; and the plurality of reference subblocks are located in a same reference picture of the one or more reference pictures.

11. A method of video encoding, the method comprising:

while encoding a current coding units (CU) of one or more CUs of each of multiple pictures, the current CU having a plurality of reference subblocks located in one or more reference pictures:

in accordance with a determination that a first set of predefined conditions for enabling a subblock-based temporal motion vector prediction (SbTMVP) mode are satisfied:

encoding the current CU using the SbTMVP mode; and signaling, into a video bitstream, the syntax elements associated with the SbTMVP mode;

wherein the first set of predefined conditions comprises at least one of the following conditions:

a difference between a first quantization parameter (QP) value for a first reference subblock of the plurality of reference subblocks and a second QP value for a second reference subblock of the plurality of reference subblocks is within a threshold QP value difference;

a plurality of motion vectors corresponding to a plurality of sub-CUs of the current CU have a same prediction direction;

each of the plurality of motion vectors corresponding to the plurality of sub-CUs of the current CU has a same reference index; and the plurality of reference subblocks are located in a same reference picture of the one or more reference pictures.

12. The method of claim 11, further comprising:

after encoding the current CU using the SbTMVP mode:

identifying a first sub-CU and a second sub-CU within the current CU, the first and second sub-CUs being adjacent to each other; and in accordance with a determination that the first sub-CU and the second sub-CU satisfy a second set of predefined conditions, performing a filter operation at a boundary between the first sub-CU and the second sub-CU.

13. The method of claim 12, wherein the filter operation uses a deblocking filter.

14. The method of claim 13, wherein the performing the filter operation comprises applying the deblocking filter at the boundary between the first sub-CU and the second sub-CU.

15. The method of claim 11, wherein the determination that the first sub-CU and the second sub-CU satisfy the second set of predefined conditions comprises:

determining that the first sub-CU corresponds to a first reference index and the second sub-CU corresponds to a second reference index, distinct from the first reference index.

16. The method of claim 12, wherein the determination that the first sub-CU and the second sub-CU satisfy the second set of predefined conditions comprises:

determining that the first sub-CU corresponds to a reference subblock located in a first reference picture and the second sub-CU corresponds to a reference subblock located in a second reference picture, distinct from the first reference picture.

17. The method of claim 12, wherein the determination that the first sub-CU and the second sub-CU satisfy the second set of predefined conditions comprises:

determining a first motion vector corresponding to the first sub-CU;

determining a second motion vector corresponding to the second sub-CU; and determining that a difference between the first motion vector and the second motion vector has a magnitude that exceeds a threshold magnitude.

18. The method of claim 17, wherein the determining that the difference between the first motion vector and the second motion vector has the magnitude that exceeds the threshold magnitude further comprises:

determining that a difference between a horizontal component of the first motion vector and a horizontal component of the second motion vector has a magnitude that exceeds a horizontal threshold magnitude.

19. The method of claim 17, wherein the determining that the difference between the first motion vector and the second motion vector has the magnitude that exceeds the threshold magnitude further comprises:

determining that a difference between a vertical component of the first motion vector and a vertical component of the second motion vector has a magnitude that exceeds a vertical threshold magnitude.

20. A method of storing a bitstream, the method comprising:

performing the method of video encoding of claim 11 to generate a video bitstream; and storing the video bitstream.

\* \* \* \* \*